Figure 1:
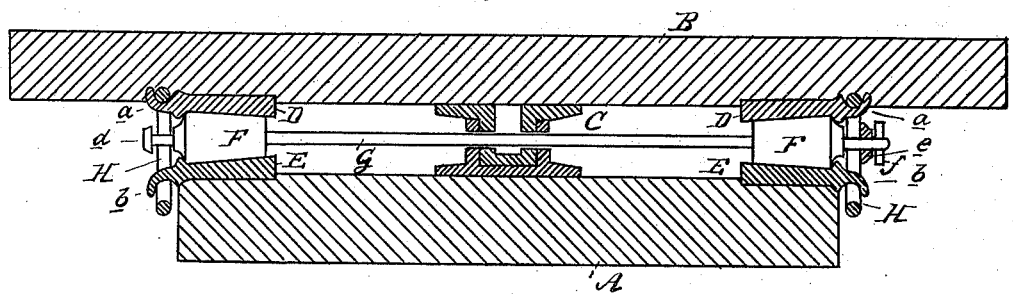

(No Model.)

F. G. SUSEMIHL.
CAR BEARING.

No. 311,618. Patented Feb. 3, 1885.

Attest:
John Schumann

Inventor:
Francis G. Susemihl
by his Atty

UNITED STATES PATENT OFFICE.

FRANCIS G. SUSEMIHL, OF DETROIT, MICHIGAN.

CAR-BEARING.

SPECIFICATION forming part of Letters Patent No. 311,618, dated February 3, 1885.

Application filed November 5, 1884. (No model.)

*To all whom it may concern:*

Be it known that I, FRANCIS G. SUSEMIHL, of Detroit, in the county of Wayne and State of Michigan, have invented new and useful Improvements in Railway-Car Bearings; and I do hereby declare that the following is a full, clear, and exact description thereof, reference being had to the accompanying drawings, which form a part of this specification.

This invention relates to an improvement in running-gear for railroad-cars; and the invention consists, first, in improved side bearings, and, second, in adapting certain parts of the same to form a safety device.

The advantage of anti-friction side bearings which support the body of a railroad-car, or portion thereof, upon the ends of the truck-bolster continuously or intermittently in connection with the center bearing or center guide has been theoretically demonstrated heretofore, but their more general use in practice has been delayed by the indifferent results obtained with the devices as now constructed for this purpose. The necessity of anti-friction contacts for these bearings is well understood, as otherwise the required freedom of the truck to turn upon its center bearing or guide could not be obtained. Thus we find at the present state of the art of constructing such side bearings for railroad-cars one or more steel rollers interposed between the primary contacts of each side bearing. In one form these rollers are journaled upon one of the primary contacts, having the face of the roller in rolling contact only with the other one. In another form the roller is so placed between the primary contacts that its face comes in rolling contact with both of them. The first form does not constitute an anti-friction bearing as far as the practical results have demonstrated. This is easily explained by the fact that the space between the car-transom and the truck-bolster is so restricted that the rollers have to be made of too small a diameter to turn freely with a heavy load upon them, in consequence of which they become flat and constitute simply a rubbing surface. The second form will operate very well as an anti-friction bearing; but another difficulty incident to this form has prevented practical success, and this is owing to the liability of the rollers to get accidentally displaced, and thus become inoperative, and all attempts to overcome this difficulty have impaired the use of the roller as an anti-friction bearing.

It is the object of my present invention to use anti-friction rollers of the second form above described, and to overcome the difficulty of the rollers becoming accidentally displaced by means of a certain arrangement of swinging links or gates which positively guide the rollers without in the least interfering with their free travel.

Figure 3:
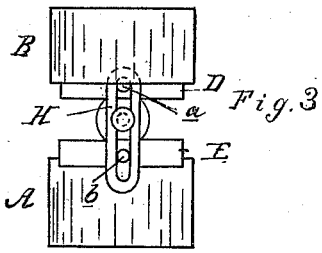
Figure 2:
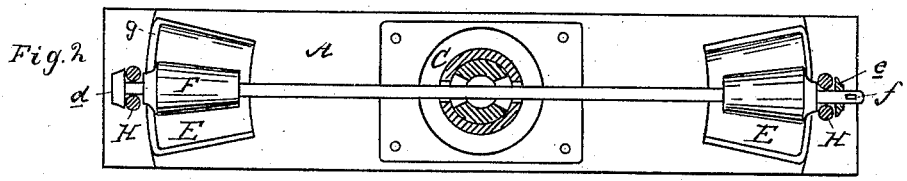
Figure 4:
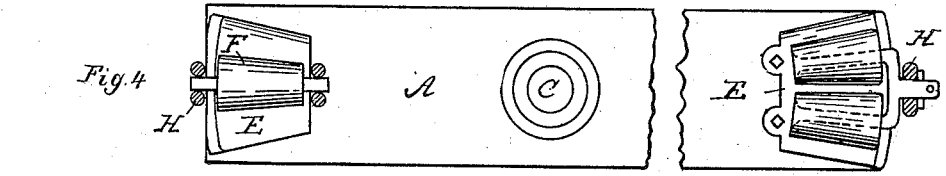

Figure 1 is a vertical central section through the truck-bolster and the transom of the car-frame with my improved side bearings in position. Fig. 2 is a plan. Fig. 3 is an end view. Fig. 4 is a plan of a modification thereof.

In the accompanying drawings, which form a part of this specification, A represents the bolster of a car-truck; B, the corresponding transom of the car-frame, and C a center bearing or guide of approved form.

The side bearings of the car are arranged upon the ends of the bolster, and each bearing consists, substantially, of the bearing-plates D E, and the roller F interposed between the two bearing-plates. The roller F may be cylindrical, with its axis intersecting the axis of the center bearing or guide; but it is preferably made in the shape of a conical frustum, having its apex in the axis of the center bearing or guide, so as to give it the freest possible travel in its circular path around the center. The bearing-plates D E are respectively secured to the bolster and transom, and are of proper shape and size to make contact the whole length of the roller in any position into which the oscillations of the bolster and transom may turn the roller.

G is an axle upon which the rollers F are mounted. This axle passes through the central bearing or guide, C, which latter is provided for the purpose with sufficiently large slots to give free passage to that axle and permit it to oscillate in the required degree.

H is a link or slotted gate, pivotally connected at the upper ends to the transom at *a*, and at the lower end to the bolster at *b*, one of the pivots, preferably the lower one, being so arranged as to allow the link to be drawn up or pushed down, as the oscillations of the transom or of the bolster demand it.

The axle G projects beyond the rollers F, and these projecting ends are made to engage between the legs of the links, which latter form loops just wide enough to admit the axles without letting them play sidewise.

In practice it will be found that the rollers F have a perfectly free action as anti-friction rollers, and as the links H guide each roller in a perfectly positive manner it cannot get accidentally displaced, as it is liable to do without such guides. To get the proper movement of the swinging links H in relation to the axle G of the roller, it is necessary that the pivots $a\,b$ of each link are at equal distances from the center of the axle G—that is, if the link is perfectly straight, as it preferably should be. When the car is upon a straight track the links H should hang perpendicularly, and to allow the truck to turn freely with the curve of the track, the loops of the links must be made sufficiently long to accommodate themselves to the oscillations of the truck; but in order to gain a new point, I do not make them any longer than required for that purpose. This enables the links to act as safety devices, the beneficial action of which in accidents of some kinds is well understood.

To allow the truck to be easily detached from the car-body in case of needed repair, I make one of the two pivots of each link, preferably the lower one, $b$, so that the link can be disengaged from it. There is no king-bolt needed with my construction, its use being obviously unnecessary in connection with the links H. This is often a great advantage when it is considered that the king-bolt cannot be withdrawn unless access to it is had from the inside of the car, thus often requiring the removal of freight. The axle G, I provide at one end with a solid head, $d$, and at the other end I place a washer, $e$, and secure it by a key, $f$. By making one or both of the rollers F detachable from the axle G the parts may then be easily detached.

To prevent the rollers F from having any end-play a flange, $g$, may be cast upon the outer edge of the lower or both bearing-plates.

The construction of side bearings herein described may be easily varied within the spirit of my invention, and in Fig. 4 I show two modifications, in which both the rollers are on stub-axles. In one modification the roller of each bearing is guided by two links, one being on the inside and the other on the outside. In the other two rollers are used for each bearing, but both are guided by a single link only.

What I claim as my invention is—

1. In a side bearing for cars, the combination of an anti-friction roller, having its face in contact with both of the primary bearings, with one or more swinging links pivotally secured to the upper and lower bearing, respectively, and embracing with its loop or loops the projecting end or ends of the axle of the roller for the purpose of preventing its accidental displacement from its prescribed position, substantially as described.

2. In a side bearing for cars, the combination of the anti-friction rollers F F, the axle G, on which they are mounted, the swinging links H H, pivotally secured to the upper and lower bearings, respectively, and embracing with their loops the projecting ends of the axle G of the rollers, all combined and operating substantially as and for the purpose specified.

3. In a side bearing for cars, the pivots $a\,b$, placed at equal distances above and below the axis of the anti-friction roller F, in combination with the link H, swinging upon these pivots and embracing the axle of the roller, for the purpose of giving a coincident center of motion to the roller and to the link, substantially as set forth.

4. In a side bearing for cars, the swinging links H H, pivotally secured at one end to the transom of the car, and at the other to the bolster of the truck, and forming a loop of limited length to prevent the abnormal oscillation of the two parts, substantially as and for the purpose described.

FRANCIS G. SUSEMIHL.

Witnesses:
H. S. SPRAGUE,
E. SCULLY.